United States Patent
Jouin et al.

(10) Patent No.: US 8,956,480 B2
(45) Date of Patent: Feb. 17, 2015

(54) METHOD OF FABRICATING A FRICTION PART BASED ON C/C COMPOSITE MATERIAL

(75) Inventors: Jean-Marie Jouin, Versailles (FR); Eric Lherm, Rignieux-le-Franc (FR); Philippe Turgis, Le Chesnay (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 0 days.

(21) Appl. No.: 12/969,394

(22) Filed: Dec. 15, 2010

(65) Prior Publication Data
US 2011/0139346 A1   Jun. 16, 2011

(30) Foreign Application Priority Data
Dec. 16, 2009   (FR) .................. 09 59036

(51) Int. Cl.
| | |
|---|---|
| C03B 29/00 | (2006.01) |
| C04B 33/34 | (2006.01) |
| C01B 31/00 | (2006.01) |
| B28B 1/00 | (2006.01) |
| C04B 35/83 | (2006.01) |
| D04H 1/4242 | (2012.01) |
| D04H 1/558 | (2012.01) |
| F16D 65/12 | (2006.01) |
| F16D 69/02 | (2006.01) |
| B32B 17/12 | (2006.01) |

(52) U.S. Cl.
CPC ............ *C04B 35/83* (2013.01); *D04H 1/4242* (2013.01); *D04H 1/558* (2013.01); *F16D 65/12* (2013.01); *F16D 69/023* (2013.01); *C04B 2235/614* (2013.01); *C04B 2235/656* (2013.01); *C04B 2235/661* (2013.01); *C04B 2235/662* (2013.01); *F16D 2200/0052* (2013.01)
USPC ............... 156/89.11; 156/89.26; 264/642; 264/640; 264/653; 264/29.1; 264/29.7; 428/293.4

(58) Field of Classification Search
USPC .......... 156/148, 89.11, 89.26; 264/29.1, 29.7, 264/642, 654, 656; 428/293.4
See application file for complete search history.

(56) References Cited

U.S. PATENT DOCUMENTS

| | | | | |
|---|---|---|---|---|
| 4,790,052 | A | * | 12/1988 | Olry ............................ 28/110 |
| 5,143,184 | A | * | 9/1992 | Snyder et al. ........... 188/218 XL |
| 5,439,080 | A | * | 8/1995 | Haneda et al. .......... 188/218 XL |

(Continued)

FOREIGN PATENT DOCUMENTS

| | | |
|---|---|---|
| EP | 1 521 731 | 4/2005 |
| EP | 2 088 347 | 8/2009 |

(Continued)

OTHER PUBLICATIONS

Vallerot et al., "Quantitative structural and textural assessment of laminar pyrocarbons through Raman spectroscopy, electron diffraction and few other techniques", Carbon 44, 9(2006) 1833-1844.*

*Primary Examiner* — Alex Efta
(74) *Attorney, Agent, or Firm* — Pillsbury Winthrop Shaw Pittman, LLP

(57) ABSTRACT

The carbon-carbon composite material is obtained by densification with a pyrolytic carbon matrix originating from a precursor in gaseous state at least in a main external phase of the matrix, and, at the end of the densification, final heat treatment is performed at a temperature lying in the range 1400° C. to 1800° C.

7 Claims, 1 Drawing Sheet

(56) References Cited

U.S. PATENT DOCUMENTS

| | | |
|---|---|---|
| 5,733,611 A | 3/1998 | Thurston et al. |
| 5,789,026 A * | 8/1998 | Delperier et al. ........... 427/249.2 |
| 5,792,715 A | 8/1998 | Duval et al. |
| 5,904,957 A | 5/1999 | Christin et al. |
| 6,001,419 A * | 12/1999 | Leluan et al. ............... 427/249.2 |
| 6,009,605 A | 1/2000 | Olry et al. |
| 6,077,464 A * | 6/2000 | Murdie et al. ................ 264/29.5 |
| 6,183,583 B1 * | 2/2001 | Duval et al. ..................... 156/148 |
| 6,221,475 B1 * | 4/2001 | Domergue et al. ......... 428/292.1 |
| 6,410,088 B1 * | 6/2002 | Robin-Brosse et al. ... 427/249.2 |
| 6,767,602 B1 * | 7/2004 | Duval et al. .................. 428/36.1 |
| 7,052,643 B2 | 5/2006 | Sion |
| 7,351,390 B2 | 4/2008 | Loncle et al. |
| 7,410,630 B2 | 8/2008 | Loncle et al. |

FOREIGN PATENT DOCUMENTS

| | | |
|---|---|---|
| EP | 2 093 453 | 8/2009 |
| FR | 2770233 A1 * | 4/1999 |
| WO | WO 96/12842 | 5/1996 |
| WO | WO 99/40042 | 8/1999 |
| WO | WO 2006/067184 | 6/2006 |

\* cited by examiner

METHOD OF FABRICATING A FRICTION PART BASED ON C/C COMPOSITE MATERIAL

CROSS REFERENCE TO RELATED APPLICATIONS

This application is based upon and claims the benefit of priority from French Patent Application No. 09/59036, filed Dec. 16, 2009, the entire content of which is incorporated herein by refernce.

BACKGROUND OF THE INVENTION

The invention relates to fabricating C/C composite material friction parts, particularly, but not exclusively, airplane brake disks.

Herein, the term fraction parts "based" on C/C composite material is used to mean friction parts made of C/C composite material or made essentially of C/C composite material, i.e. that may include small percentages by weight of additional elements, e.g. ceramic particles, in particular for the purpose of improving wear resistance.

Airplane brake disks based on C/C composite material are in widespread use. A well-known method of fabricating such disks comprises the following steps:

making an annular preform out of carbon-precursor fibers, typically pre-oxidized polyacylonitrile (PAN) fibers;

applying carbonization heat treatment to transform the carbon precursor and obtain an annular preform made of carbon fibers and intended to form the fibrous reinforcement of the composite material; and densifying the carbon fiber preform with a carbon matrix.

An annular preform of carbon precursor fibers may be made in various ways:

forming a thick fiber structure by superposing plies of two-dimensional fiber texture, bonding together the superposed plies, and cutting out annular preforms from the fiber structure, the two-dimensional fiber texture being for example a multidirectional (nD) fiber sheet obtained by superposing unidirectional (UD) fiber sheets and bonding the UD sheets together, e.g. by light needling;

cutting out annular plies or plies in the form of solid disks from a two-dimensional fiber texture, e.g. an nD sheet, and then superposing annular fiber plies and bonding the superposed plies together in order to obtain directly an annular fiber preform or a disk-shaped fiber preform from which the central portion is then cut out so as to obtain an annular preform; or winding flat turns of a helical braid or fabric so as to form superposed annular fiber plies, and bonding the plies together.

In those various processes, the bonding between the superposed plies is conventionally performed by needling. For this purpose, and typically, the superposed plies are placed on a horizontal support and needling is performed progressively as the plies are superposed on one another, with a needling pass being performed each time a new ply is added. The needling is performed by means of barbed needles that penetrate vertically (Z direction) into the fiber structure or fiber preform that is being formed, with bonding between plies being obtained by the fibers that are moved by the needles so that they occupy the Z direction. The horizontal support is caused to move down by one step each time a new ply is applied after a needling pass so as to control the density in the Z direction of fibers passing through the thickness of the fiber structure or the fiber preform.

Concerning the preparation of annular preforms made of carbon precursor fibers, reference may be made for example to the following documents: U.S. Pat. Nos. 4,790,052, 5,792, 715, and 6,009,605.

It should be observed that making an annular preform out of carbon fibers directly by superposing carbon fiber plies and bonding those plies together by needling has also been proposed.

Prior to densifying with a PyC matrix, it is known to perform high temperature heat treatment on the carbon fiber preforms, typically at a temperature of at least 1600° C., in particular to eliminate any impurities contained in the fibers, in particular residual sodium stemming from the process for preparing carbon precursor fibers. By way of example, reference may be made to the following documents: U.S. Pat. Nos. 7,351,390, 7,052,643, and 7,410,630.

Densification by a carbon matrix may be achieved by a liquid-type process, namely by impregnating the preform with a carbon precursor in liquid state, such as a resin or pitch, and by transforming the precursor into carbon by carbonization under heat treatment.

The densification with a carbon matrix may also be performed by a chemical vapor infiltration (CVI) process comprising, in well-known manner, placing carbon fiber preforms in an enclosure and admitting into the enclosure a gas that contains one or more gaseous precursors of carbon, with the conditions, in particular of temperature and pressure, within the enclosure being controlled so as to enable the gas to diffuse within the preforms and form a PyC deposit therein by the precursor(s) decomposing. The gas typically comprises methane and/or propane as carbon precursor(s), it being understood that other gaseous hydrocarbon precursors could be used. A plurality of annular preforms placed in a stack may be densified simultaneously within a single enclosure, as described in particular in document U.S. Pat. No. 5,904,957.

It is also possible to perform densification with a PyC matrix using a "vaporization" process comprising, likewise in known manner, immersing an annular preform of carbon in a bath of a liquid carbon precursor, and heating the preform, e.g. by coupling with an induction coil. On contact with the heated preform, the liquid vaporizes. The vapor diffuses and generates a PyC deposit by decomposition within the preform. Reference may be made in particular to document U.S. Pat. No. 5,733,611.

It is also known to achieve densification by combining a CVI process and a liquid-type process. Documents EP 2 088 347 and EP 2 093 453 disclose a densification step by CVI followed by a densification step by impregnation with pitch and carbonization. Pitch carbonization is carried out at a temperature between 1200° C. and 1800° C., typically 1600° C. and may be followed by graphitization heat treatment at a temperature between 1600° C. and 2400° C. to graphitize the pitch-precursor carbon.

The present invention relates to the manufacture of friction parts based on C/C composite material in which the carbon of the matrix is formed of PyC originating from a precursor in gaseous state at least in a main external phase of the carbon matrix. By "PyC originating from a precursor in gaseous state" is meant here PyC obtained by a conventional CVI process as well as PyC obtained by the above mentioned vaporization process.

After densification with a PyC matrix, it is known optionally to proceed with final heat treatment at high temperature, typically higher than 2000° C., in order to graphitize the PyC matrix when it is of rough laminar type PyC or "RL-PyC". Amongst the various types of PyC that may be obtained under the conditions in which the CVI process is performed (in particular isotropic PyC, smooth laminar PyC, RL-PyC), RL-PyC is the type that lends itself to graphitization. A process for preparing an RL-PyC matrix is described in document U.S. Pat. No. 6,001,419.

Airplane brake disks made of C/C composite material with an RL-PyC matrix graphitized by final heat treatment at high temperature (material "A") presents good resistance to oxidation and gives good braking performance, in particular good stability of the friction coefficient during high energy braking such as emergency stop braking at high speed prior to takeoff, also known as rejected takeoff (RTO) braking. Nevertheless, the wear of such disks is relatively high.

Brake disks made of C/C composite material without final heat treatment at high temperature but with high temperature heat treatment performed on the carbon fiber precursor prior to densification (material "B") presents low wear at low energy, in particular braking while taxiing when cold, where that constitutes a large component of the total wear usually observed during a normal operating cycle comprising taxiing while cold (including braking) from a parking point to takeoff, flight, braking on landing, and taxiing while hot (with braking) from the runway to a parking point. Nevertheless, compared with material A, lower resistance to oxidation and smaller stability of the friction coefficient during high energy braking have been observed.

OBJECT AND SUMMARY OF THE INVENTION

An object of the invention is to propose a method of fabricating C/C composite material brake disks and more generally friction parts based on C/C composite material that present a better compromise between resistance to friction wear, resistance to oxidation, and stability of braking performance, the carbon of the matrix being formed of pyrolytic carbon originating from a precursor in gaseous state at least in a main external phase of the matrix.

This object is achieved by a method of fabricating a friction part based on carbon/carbon composite material, the method comprising making a carbon fiber preform, densifying the preform with said matrix of pyrolytic carbon, and, after said densification, performing a final heat treatment at a temperature lying in the range 1400° C. to 1800° C., preferably in the range 1550° C. to 1700° C.

As shown below, and in completely unexpected manner, performing a final heat treatment within such particular temperature range makes it possible, in comparison with the prior art method not including final treatment at high temperature, to conserve low wear, or indeed to reduce wear even further, while significantly improving braking performance, including during high energy braking, and improving resistance to oxidation, even though the final heat treatment is performed at a temperature that is well below the threshold for graphitizing a PyC matrix.

In an embodiment, in the whole matrix, the carbon of the matrix is formed by pyrolytic carbon originating from a precursor in gaseous state.

In another embodiment, in an internal minority phase of the matrix, the carbon of the matrix is obtained by impregnation of the preform by a carbon precursor in liquid state and carbonization of the precursor, the carbon of the internal minority phase of the matrix representing preferably no more that 20% of the total volume of the carbon of the matrix.

Advantageously, prior to densification, heat treatment is performed on the carbon fiber preform at a temperature higher than 1600° C.

Also advantageously, a pyrolytic carbon matrix is formed of the rough laminar type.

In an embodiment, the fiber preform is made by superposing two-dimensional fiber plies made of carbon precursor fibers, bonding the plies together by needling progressively as plies are superposed, and carbonizing to transform the carbon precursor fibers into carbon fibers.

In another embodiment, the preform is made by superposing two-dimensional fiber plies made of carbon fibers and bonding the plies together by needling progressively as the plies are superposed.

In both cases, the needling of each newly superposed ply is performed with a needling density of no more than 90 strokes per square centimeter (strokes/cm$^2$).

BRIEF DESCRIPTION OF THE DRAWING

The invention can be better understood on reading the following description given by way of non-limiting indication and with reference to the accompanying drawing, in which.

DETAILED DESCRIPTION OF IMPLEMENTATIONS

Particular implementations of the invention are described below in the context of its application to airplane brake disks. Nevertheless, the invention is applicable more generally to friction parts of various shapes, specifically disks, pads, and shoes.

Figure 1:
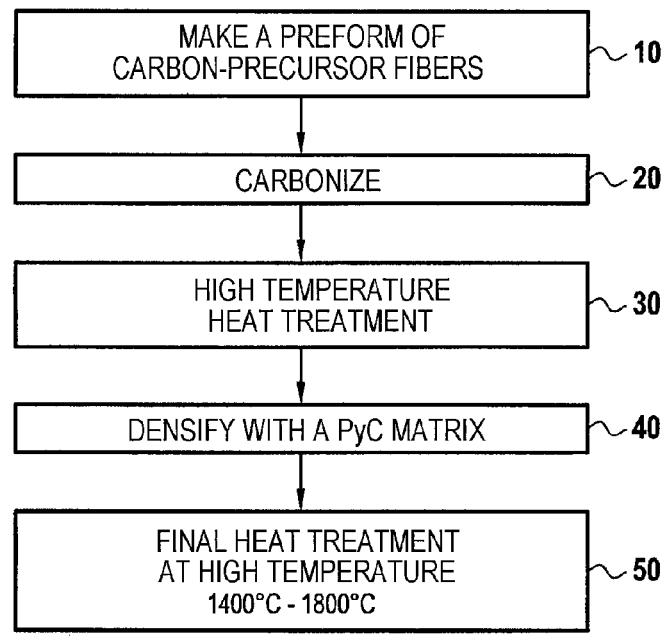
FIG. 1 shows successive steps in a method of fabricating a C/C composite material brake disk in an implementation of a method in accordance with the invention.

A first step 10 of the method of FIG. 1 consists in making a fiber preform out of carbon-precursor fibers. For this purpose it is possible to use any of the processes mentioned above, namely:

- forming a thick fiber structure by superposing plies of two-dimensional fiber texture and bonding these plies together by needling, the fiber texture being for example an nD sheet, and cutting annular preforms out of the fiber structure; or
- cutting out annular plies or disk-shaped plies from a two-dimensional texture and forming preforms by superposing the plies and bonding the plies together by needling; or
- winding flat turns of a helical fabric or of a helical braid in order to form superposed annular plies, and bonding the plies together by needling.

The needling is performed in successive passes using barbed needles, with needling being performed over the entire area of each newly applied ply. It is possible to use the needling process described in document WO 96/12842. Preferably, while needling each ply, the needling density (number of needle strokes per unit area) is relatively small, while nevertheless providing sufficient inter-ply bonding to impart the resistance to delamination that is required in the brake disk that is to be made, i.e. the resistance to decohesion as a result of bonding between plies breaking. A needling density of not less than 30 strokes/cm$^2$ and not more than 90 strokes/cm$^2$ is preferred.

In the following step 20, the preform made of carbon precursor fibers is transformed into a carbon fiber preform by carbonization heat treatment at a temperature lying in the range 750° C. to 1100° C., e.g. about 900° C.

After carbonization, high-temperature heat treatment is performed on the carbon fiber preform (step 30). The heat treatment is performed under an inert atmosphere, e.g. in an enclosure that is swept by a stream of nitrogen, at a temperature higher than 1600° C., e.g. lying in the range 1600° C. to 2500° C. The purpose is to eliminate any residual impurities that might be contained in the fibers, in particular sodium.

The carbonization (step 20) and the high-temperature heat treatment (step 30) may follow on one from the other in the same enclosure, as described in document EP 1 521 731.

Thereafter, in step 40, the heat-treated carbon fiber preform is densified by a PyC matrix originating from a precursor in gaseous state. In a conventional CVI process, use is made for example of a gaseous phase comprising a mixture of methane and propane, with densification being performed at a temperature lying in the range about 850° C. to 1050° C. at a low pressure lying in the range about 0.5 kilopascals (kPa) to 3.3 kPa, with the parameters of the conventional CVI process (temperature, pressure, gas flow rate, propane content in the methane/propane mixture, transit time of the gas through the densification enclosure) being selected or possibly varied during the process in order to obtain a matrix, e.g. of the RL-PyC type. Reference may be made to above-mentioned document U.S. Pat. No. 6,001,419. The high-temperature heat treatment of the carbon fiber preform (step 30) and its densification by a conventional CVI process may follow on one from the other in the same enclosure as described in document U.S. Pat. No. 7,052,643. In a process of decomposition by vaporizing, use is made for example of cyclohexane as a liquid precursor of carbon, and the preform is heated to a temperature lying in the range 850° C. to 1000° C. approximately (see in particular document WO 99/40042).

At the end of the densification, final heat treatment at high temperature is performed (step 50). This heat treatment is performed at a temperature lying in the range 1400° C. to 1800° C., preferably in the range 1550° C. to 1700° C. This produces a C/C composite material brake disk in which the carbon of the matrix is formed of PyC originating from a precursor in gaseous state. The disk is ready for use after being machined to the desired dimensions and after anti-oxidation protection has been applied to its non-friction surfaces.

Although the final heat treatment performed in this specific temperature range (1400° C. to 1800° C.) does not induce graphitization of the RL-PyC matrix, it has been found in completely unexpected manner that it does contribute to increasing thermal diffusivity in the thickness of the resulting C/C material disk, to better resistance to oxidation, and to better braking performance, in particular during high-energy braking, while presenting low friction wear. It has also been found that this final heat treatment gives rise to a reduction in transverse stiffness (in the plane of the disk) and of axial stiffness (in the thickness of the disk). As a result, during braking, better geometrical matching is obtained of the friction face of the disk (for a disk having only one friction face) or of each of the friction faces of the disk (for a disk having two opposite friction faces), i.e. a greater contact area is obtained with the facing friction surface. This avoids the risk of limiting friction to small areas of the or each friction face, which would give rise to the appearance of very hot points that encourage wear by oxidation and that limit friction performance.

In a variant of the method described with reference to FIG. 1, steps 10 and 20 can be combined so as to make a carbon fiber preform directly from a superposition of carbon fiber plies with the fiber plies being bonded together. The bonding may be achieved by needling with a needling density preferably of no more than 90 strokes/cm$^2$.

In another variant, the densification with PyC originating from a precursor in gaseous state may be preceded by a first densification step with an internal matrix phase made of carbon obtained by impregnating the fibrous preform with a carbon precursor in liquid state, for instance a resin or pitch, and transforming the precursor into carbon by carbonization. Such an internal matrix phase may in particular achieve a consolidation of the preform, namely a bonding of the fibers together sufficient to rigidify the preform. Such an internal phase represents a minority fraction of the carbon of the matrix, preferably no more that 20% of the total volume of the carbon of the matrix, the external matrix phase formed of PyC originating from a precursor in gaseous state forming a main or majority part of the matrix.

Also in a variant, solid fillers of a material other than carbon may be introduced into the composite material while it is being prepared, in particular ceramic particles seeking to improve wear resistance. The quantity of such fillers is relatively small, e.g. less than 5% by weight in the composite material. One process for introducing ceramic particles is described in document WO 2006/067184.

EXAMPLE 1

C/C composite material brake disks were made by a method of the type described with reference to FIG. 1 under the following particular conditions:

annular preforms were made of pre-oxidized PAN fibers by being cut out from a fiber structure formed by superposing plies constituted by three-dimensional (3D) sheets of pre-oxidized PAN fibers and bonding the plies together by needling. The 3D sheets were made by superposing three UD sheets forming angles of 60° relative to one another and bonding the UD sheets together by light needling. The plies were needled together in such a manner as to obtain a fiber density in the Z direction that was substantially constant through the thickness of the preforms by using a process of the kind described in document U.S. Pat. No. 5,792,715. The Z direction fiber content was about 3% (i.e. 3% of the apparent volume of the preform was occupied by Z fibers);

carbonizing the pre-oxidized PAN fiber preforms at a temperature of about 900° C. to obtain carbon fibers;

high-temperature heat treatment (HTT) of the carbon fiber preforms under an inert gas (nitrogen), a first family of preforms being treated at 1600° C., a second family at 1900° C., and a third family at 2200° C.;

densification by a conventional CVI process using a gas constituted by a mixture of methane and propane, the densification parameters being selected so as to obtain an RL-PyC matrix; and final heat treatment of the C/C composite material disks obtained after densification at different selected temperatures.

After the final heat treatment the disks were subjected to the same wear tests by applying braking tests that reproduced an operating cycle comprising:

taxiing while cold with several braking operations between a parking point and takeoff;
flight;
braking during landing (bringing the disks to hot state);
taxiing while hot with several braking operations between the runway and the parking point.

Wear was measured in micrometers per friction face pre operating cycle (μm/face/cycle).

Figure 2:
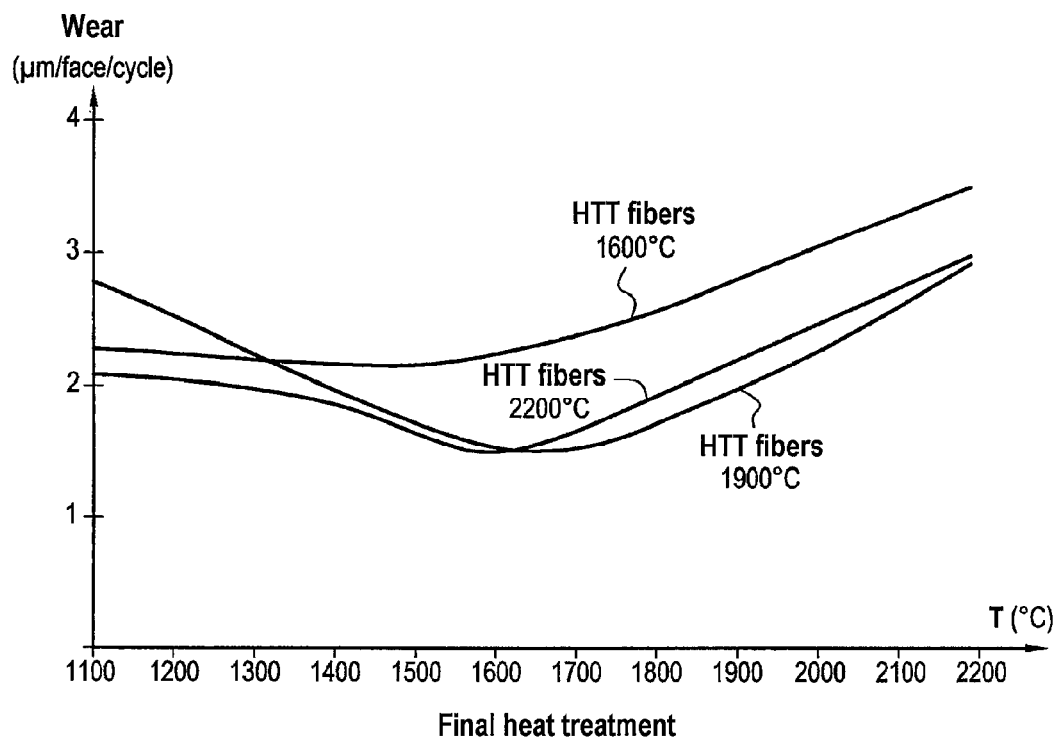
FIG. 2 is a graph plotting curves that show the relationships between wear and final heat treatment temperature of airplane brake disks of made of C/C composite material for different heat treatment temperatures of the carbon fiber preforms prior to densification.

The curves of FIG. 2 show wear as measured during braking tests performed using two-rotor brakes constituted by brakes obtained from the three preform families for different temperatures T of the final heat treatment.

It can be seen in general that there is a very great reduction in wear for a final heat treatment temperature lying in the range 1400° C. to 1800° C., in particular in the range 1550° C. to 1700° C., compared with a final heat treatment at 2200° C. that induces graphitization.

Compared with disks having no final heat treatment, i.e. without heat treatment at a temperature significantly higher than that encountered during densification, it was also found, surprisingly, that there is a substantial improvement in wear resistance when the carbon fiber preforms were subjected to heat treatment at a high temperature, higher than 1600° C.

EXAMPLE 2

The procedure was the same as in Example 1, except:
HTT of the carbon fiber preforms at a temperature of 1850° C.; and
densification by decomposition of vaporized cyclohexane as a carbon precursor.

The table below shows the wear as measured in the same manner as in Example 1, for different temperatures of final heat temperature of the C/C composite material disks obtained after densification.

| Temperature of final heat treatment | Wear (μm/face/cycle) |
| --- | --- |
| 2000° C. | 3.75 |
| 1850° C. | 3.15 |
| 1650° C. | 2.50 |

A significant reduction in wear was observed for a final heat treatment temperature of 1650° C. as compared with a temperature of 2000° C.

What is claimed is:

1. A method of fabricating a friction part based on carbon/carbon composite material formed of a fiber reinforcement and a carbon matrix, the method comprising:
    making a preform of carbon precursor fibers and transforming the preform into a carbon fiber preform using a carbonization heat treatment at a temperature in the range 750° C. to 1100° C.;
    treating the carbon fiber preform in an inert atmosphere at a temperature between 1600° C. and 2500° C.;
    densifying the preform with pyrolytic carbon originating from a precursor in gaseous state to form the whole carbon matrix with said pyrolytic carbon at a temperature between 850° C. and 1050° C. and at a pressure between 0.5 kPa and 3.3 kPa; and
    following said densification performing a final heat treatment at a temperature lying in the range 1400° C. to 1800° C. without inducing graphitization of said carbon matrix.

2. A method according to claim 1, wherein the final heat treatment is performed at a temperature lying in the range 1550° C. to 1700° C.

3. A method according to claim 1, wherein the pyrolytic carbon matrix is formed of a rough laminar type.

4. A method according to claim 1, wherein the fiber preform is made by superposing two-dimensional fiber plies made of carbon precursor fibers, bonding the plies together by needling progressively as plies are superposed, and carbonizing to transform the carbon precursor fibers into carbon fibers.

5. A method according to claim 4, wherein the needling of each newly superposed ply is performed with a needling density of no more than 90 strokes/cm$^2$.

6. A method of fabricating a friction part based on carbon/carbon composite material formed of a fiber reinforcement and a carbon matrix, the method comprising:
    making a preform of carbon precursor fibers and transforming the preform into a carbon fiber preform using a carbonization heat treatment at a temperature in the range 750° C. to 1100° C.;
    treating the carbon fiber preform in an inert atmosphere at a temperature between 1600° C. and 2500° C.;
    densifying the preform with pyrolytic carbon originating from a precursor in gaseous state to form the whole carbon matrix with said pyrolytic carbon at a temperature between 850° C. and 1050° C. and at a pressure between 0.5 kPa and 3.3 kPa; and
    following said densification performing a final heat treatment at a temperature lying in the range 1400° C. to 1800° C., said temperature being below a temperature that induces graphitization of said carbon matrix.

7. A method according to claim 6, wherein the final heat treatment is performed at a temperature lying in the range 1550° C. to 1700° C.

* * * * *